United States Patent [19]

DeLuca et al.

[11] Patent Number: 4,710,090

[45] Date of Patent: Dec. 1, 1987

[54] HYDRAULIC HOIST PARTICULARLY FOR MOUNTING ON PICK-UP TRUCK BEDS OR THE LIKE

[76] Inventors: Charles Q. DeLuca, 33-1 8th Floor, Sunny Building An-ho Road, Taipei; Huang J. Shiung, No. 227, Sec. 2 Po Ai Rd., Chiayi, both of Taiwan

[21] Appl. No.: 866,125

[22] Filed: May 22, 1986

[51] Int. Cl.⁴ .............................................. B65G 67/02

[52] U.S. Cl. .................................... 414/550; 212/238; 414/546

[58] Field of Search ............... 414/496, 542, 543, 546, 414/547, 549, 550, 555, 569; 212/199, 231, 232, 244, 237–239, 252

[56] References Cited

U.S. PATENT DOCUMENTS

| | | | |
|---|---|---|---|
| 1,448,814 | 3/1923 | Norris | 414/543 |
| 2,517,085 | 8/1950 | Cirillo | 212/252 X |
| 2,528,588 | 11/1950 | Forslund | 212/231 X |
| 2,772,795 | 12/1956 | Cramer et al. | 414/543 |
| 2,842,271 | 7/1958 | Witcher | 212/238 |
| 2,923,253 | 2/1960 | Geier et al. | 212/231 X |
| 2,947,425 | 8/1960 | Nichols | 212/238 X |
| 3,019,918 | 2/1962 | Keener | 414/543 |
| 3,608,742 | 9/1971 | Adolfsson | 212/238 X |
| 4,556,358 | 12/1985 | Harlan | 414/550 |

*Primary Examiner*—Leslie J. Paperner
*Assistant Examiner*—David A. Bucci
*Attorney, Agent, or Firm*—Beehler, Pavitt, Siegemund, Jagger, Martella & Dawes

[57] ABSTRACT

A hoist is provided for facilitating the loading and unloading of a vehicle. The hoist comprises a mounting for mounting to an underlying structure, an upright post connected to the mounting, a column rotatably seated on the post and having a boom pivotally connected thereto, a drive connected between the boom and column to raise and lower a free end of the boom, a sheave carried at the free end of the boom, a hoist cable looped over the sheave, an eye affixed to the column near its lower end, a chain threaded through the eye and secured at one end to the hoist cable, and an anchor located upwardly above the eye for the releasably securing the other end of the chain to the column.

6 Claims, 5 Drawing Figures

HYDRAULIC HOIST PARTICULARLY FOR MOUNTING ON PICK-UP TRUCK BEDS OR THE LIKE

BACKGROUND OF THE INVENTION

1. Field of the Invention

The present invention pertains generally to the field of hoisting devices and more particularly relates to a hoist adapted for mounting to the bed of a cargo vehicle for facilitating loading and unloading of the vehicle.

2. State of the Prior Art

Numerous vehicle mounted hydraulically operated hoists of a general type similar to the present invention are known. Such hoists typically include a vertical mast mounted for rotation about its vertical axis, and a boom hinged at one end to the upper portion of the mast so that the free end of the boom can be raised and lowered. The boom is provided at its free outer end with a pulley or equivalent means over which is looped a hoist line. One end of the hoist line is anchored to the mast while a load may be attached to the other end of the line. A power actuating device, such as a hydraulic piston unit is connected between the mast and the boom, can be extended so as to apply upward leverage for lifting the free end of the boom together with a load suspended therefrom in relation to the stationary mast. Once raised, the suspended load may be swung laterally and moved in a circular arc by pivoting or rotating the mast about its vertical axis. The power actuator can then be retracted so as to lower the free end of the boom and drop the suspended load at a location removed from the pick-up point.

The prior art nearest to the present invention known to this applicant is the portable hoist disclosed by Harlan in U.S. Pat. No. 4,556,358.

The Harlan hoist is designed for mounting to the side wall of a truck bed rather than the floor of the truck bed. However, it is sometimes desirable to fasten the hoist directly to the bed of the pick-up particularly in modern pick-up trucks with side walls constructed of relatively thin sheet metal, and not capable of withstanding heavy lateral loads. In still other installations no lateral supports may be available and it is then necessary to secure the hoist only to a horizontal surface. While some others of the previously known hoists of this general type are designed for such mounting, the mounts are too complex and may require excessive modification to the vehicle. Further, these prior art hoists are not adapted to be readily and quickly removed from the pick-up truck bed so as to make space available for loading of cargo which does not require hoisting. Since a hoist mounted to a truck bed will necessarily obstruct and take up a substantial amount of space on the cargo bed, it is desirable to facilitate quick removal of as much of the hoist structure as possible when it is not needed, but without necessarily requiring complete detachment of the hoist base which is affixed to the truck bed. No hoist known to this applicant provides an adequate solution to the aforementioned needs.

A further difficulty encountered in the Harlan hoist and in others, is that the hoist line is anchored to the hoist mast or other portion thereof in a way which does not permit ready adjustment of the hoist line length. This shortcoming can cause considerable inconvenience and at times can make impossible certain hoisting jobs. While certain known hoists of the general type contemplated herein do allow for adjustment of the hoist line length, the means provided for this purpose have been unduly complex and sometimes not safely and easily operable by persons not especially trained in the hoist's operation. Thus, a further object of the present invention is to provide simple but safe and dependable means for anchoring the hoist line in a quickly and easily adjustable manner.

It is a still further object of the present invention to provide low cost and simple solutions to the aforementioned shortcomings of the prior art so as to make low-cost vehicle mounted hoists available to the average consumer for easy after-market installation on pick-up trucks and the like and which can be easily operated without skilled assistance, all without sacrifice in safety and reliability of the hoist.

SUMMARY OF THE INVENTION

The novel hoist disclosed herein seeks to overcome these and other shortcomings of the prior art. The boom support or mast of the improved hoist comprises an upright bearing post which terminates in an upper transverse bearing surface and has a base at its lower end for attachment to an underlying structure such as the bed of a pick-up truck, and a hollow tubular column which has an open lower end and a closed upper end. The post is slideable into the open lower end of the tubular column so as to bring the upper bearing surface into internal underlying abuting relationship with the closed upper end of the support column. In an actual installation, the support column sits coaxially on the bearing post and is rotatable thereon about its vertical axis.

A hoist boom which may include two or more telescopingly extendable boom segments is hingedly connected at one end to the support column near the upper end of the column such that the boom may be pivoted in a vertical plane to raise or lower its free end. A drive unit such as a hydraulic jack unit is connected between the lower end of the column and a point along the boom spaced from its hinged end, such that raising or lowering of the boom is achieved by extending or retracting the drive unit. A sheave is carried at the free end of the boom, and a hoist cable is looped over the sheave so that one end of the cable hangs from the sheave while a chain is attached to the other end of the cable. The chain in turn is threaded through a slip-eye or ring affixed near the lower end of the support column and is releasably secured in a manner to be described to a slotted radially projecting anchor plate or chain retainer affixed near the upper end of the support column. A slot is cut in the anchor plate wide enough so as to admit the thickness of a single link of the chain into the slot. The next upwardly adjacent and transversely oriented link of the chain interlocks with the anchor plate so as to anchor the chain against downward pulling force transmitted through the cable and chain by a load suspended from the boom at the other, free end of the hoist cable. This chain anchoring arrangement readily permits the chain to be secured to the column at any one of its links thereby permitting easy and quick adjustment of the effective chain length. Safe and positive retention of the chain is ensured by a concave upper surface in the anchor plate arranged such that the open, outer end of the chain receiving slot is at a higher point of the upper flange surface than the inner closed end of the same slot. The downward pull exerted on the chain during normal hoisting will therefore cause the next uppermost chain link to slide down into the concavity of the anchor plate and prevent the chain from slipping out the open end of the slot. The chain thus follows a Z-shaped path with the two changes of direction occurring at the sheave and the slip-eye. The slip-eye acts to apply the lateral force component transmitted by a dangling load to the vertical boom support or mast at a low point near the hoist base so as to avoid dangerous lateral loading high on the upright support. The chain anchor plate however may be mounted high, near the upper end of the boom support column for the convenience of the hoist operator in adjusting the chain length and also for easy visual inspection and confirmation of proper chain anchoring.

The support column has an inner diameter slightly greater than the outside diameter of the bearing post such that the column is mounted simply by telescopically sliding onto the bearing post, and is just as readily removed therefrom together with the boom and hydraulic drive unit, leaving only the bearing post fixed to the underlying structure, e.g. to the truck bed, so as to make available the space when the hoist is not needed. The loading imposed by the chain on the support column above the slip-eye is largely axially compressive and thus more easily resisted.

These and other advantages of this invention will be better understood from the following detailed description of the invention taken with reference to the accompanying drawings.

DETAILED DESCRIPTION OF THE PREFERRED EMBODIMENT

Figures 1, 2, 3, 4, 5:
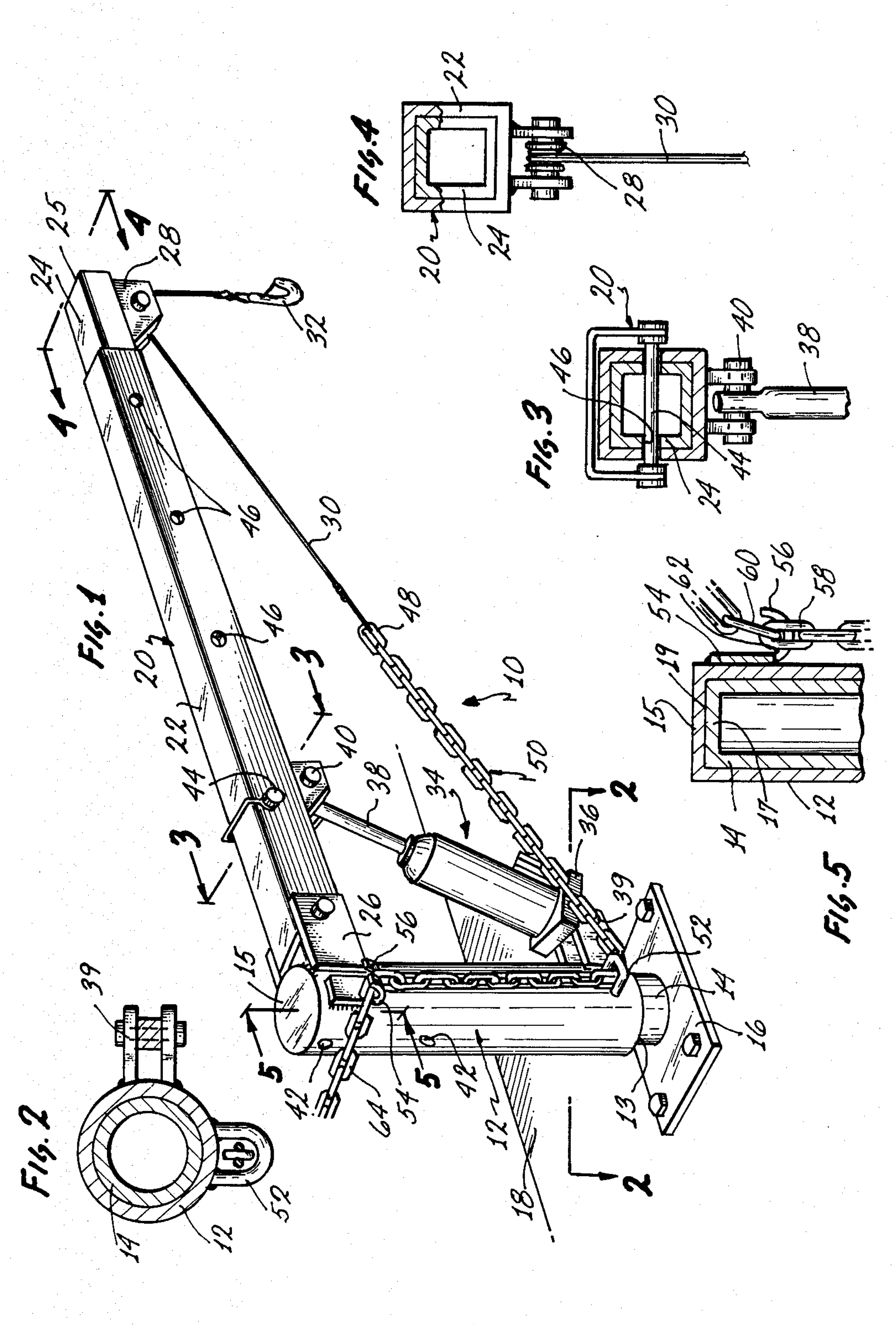
FIG. 1 is a perspective view of a hoist according to this invention.
FIG. 2 is a cross-section of the upright boom support taken along line 2—2 in FIG. 1.
FIG. 3 is a cross-section of the hoist boom taken along line 3—3 in FIG. 1.
FIG. 4 is an end view partly in cross-section of the hoist boom seen along line 4—4 in FIG. 1.
FIG. 5 is a fragmentary section taken in elevation of the upper end of the upright boom support taken along line 5—5 in FIG. 1.

With reference to the drawings, the improved hoist 10 of this invention shown in FIG. 1 has a boom support assembly consisting of a hollow cylindrical vertical support column 12 telescopically seated on a cylindrical post 14 affixed at its lower end to a base mounting plate 16 which is in turn bolted to an underlying surface or structure 18, of the horizontal bed of a cargo vehicle such as pick-up truck. The hoist 10 further includes a hoist boom 20 consisting of two telescopically slideable members 22 and 24 selectively locked at one of several relative extensions by means of a boom pin 44 inserted through aligned holes 46 in the telescoping boom segments. The inner end of the inner boom member 22 is supported by means of hinge 26 to the upper end of the column 12. The outer or free end 25 of the boom carries a sheave 28, better seen in FIG. 4, over which is looped a hoist cable 30. A loading hook 32 may be attached to the free hanging end of the cable 30 as seen in FIG. 1.

The hoist is actuated by means of a hydraulic jack 34 which has a jack base 36 supported on a lower jack hinge 39, best seen in FIG. 2, mounted to the column 12 near its lower end 13 and which allows pivotal movement of the jack 34 in relation to the column. The jack 34 includes an extensible piston rod or stem 38, the upper end of which is connected to the hoist boom 20 by upper jack hinge 40 at a point spaced away from the boom hinge 26. The hydraulic jack 34 is powered by manually pumping a removable jack handle (not shown in the drawings) which is inserted in a receptacle conventionally provided on the jack unit 34. Hydraulic pressure is built-up by the pumping action to cause stem 38 to extend from the jack 34, thereby raising the hoist boom 20. The upward pressure applied by the jack 34 raises the free outer end 25 of the boom by causing the boom to hinge at its inner end mounted to the support column 12.

As best seen in FIGS. 2 and 5 the support column 12 is a hollow cylinder closed at its upper end 15, and is rotatably coaxially seated on the closed upper end 17 of vertical post 14 which includes a transverse, horizontal upper bearing surface 19 in internal underlying abutment with the underside of the closed upper end 15 of the column 12. The outer diameter of the cylindrical post 14 is slightly undersized in relation to the internal diameter of the column 12 so as to allow rotation of the column relative to the post 14 about their common vertical axis. Grease injection fittings 42 are provided on column 12 to permit injection of lubricant material between the inner surface of the column 12 and the post 14 to thereby facilitate swinging of the boom on column 12 about the post 14.

The inner end of the hoist cable 30 is securely connected to an end link 48 of a chain 50. A U-shaped slip-eye 52 or equivalently constructed ring is affixed as by welding to the column 12 near its lower end 13. The inner opening of the eye 52 is sufficiently large to readily admit passage of the chain 50 which is threaded through the eye 52 at an intermediate point along its length between the end link 48 and an anchor plate 54, in the manner illustrated in FIGS. 1 and 2. The portion of the chain 50 extending below the slip-eye 52 is connected to the cable 30 while the portion of the chain above the eye 52 is secured to a chain anchor plate 54 welded to the column 12 near its upper end 15 and consisting of a plate bent at its lower end to a hook shape as best seen in the side view in FIG. 5. The hooked lower portion of the anchor plate 54 has a slot 56 cut into the outer edge of the plate radially to the column 12. The width of the slot 56 is such as to admit a single chain link edgewise into the slot, but to block passage of the next upwardly adjacent link 60 which is presented transversely to the slot, as shown in FIGS. 1 and 5. This interlocking action between link 60 and plate 54 securely anchors the chain 50 against the downward pulling force exerted by a load suspended from hook 32 on the hoist cable 30 and redirected along the cable and chain by the sheave 28 and slip-eye 52.

It will be appreciated that the effective length of the chain 50 can be quickly, easily and safely changed by simply inserting any selected chain link edgewise into the slot 56 of the anchor plate 54. Any extra, unused length 64 of the chain 50 may be left dangling from the anchor plate 54. The anchor plate is bent to an upwardly hooked curvature so as to define a concave upper surface 62 within which is captured the link 60 against possible slippage out of the slot 56, as best understood by reference to FIG. 5, thereby to increase the safety and reliability of the anchoring arrangement.

The plate 54 is affixed in circumferential alignment with the eye 52 on the cylindrical outer surface of the support column 12 such that the downward loading force on the anchor plate 54 is almost purely vertical through the chain slot 56 and parallel to the vertical axis of the column 12. The loading on the column above the eye 52 is substantially compressive, while the lateral load component is applied to the column at the eye 52 near the base plate mounting so as to minimize the leverage effect of the post on said base tending to amplify the lateral loading on the base mounting plate and thus to separate the base plate from the underlying surface, e.g. the cargo bed of the vehicle.

The axial length or height of the post 14 is somewhat greater than the axial length of the column 12 so that the column may be slipped onto the post and the closed upper end 15 of the column seated on the upper bearing surface 19 of the post, thus keeping the lower end 13 of the column above the base plate 16 as seen in FIG. 1 so as not to impede rotation of the column. The length of the column 12 is desirably at least three times the inner diameter of the column 12 so as to provide ample internal surface contact between the post 14 and column 12 such that the loads are distributed over relatively large, lubricated surfaces to minimize wobbling or instability while swinging the hoist about the post 14 with a load suspended from the cable 30.

While a particular embodiment of the invention has been shown and illustrated for purposes of clarity and explanation, it must be understood that many changes, substitutions, and modifications to the described embodiment will become apparent to those possessed of ordinary skill in the art without departing from the spirit and scope of the present invention which is defined only by the following claims.

What is claimed is:

1. A hoist comprising:

an upright bearing post having a base at its lower end for mounting to an underlying structure such as the bed of a cargo vehicle;

a tubular support column rotatably coaxially supported on said upright post and having an upper end and a lower end;

a boom hingedly connected at one end to the upper end of said column such that the opposite free end of the boom can be raised or lowered;

drive means connected between said column and said boom operative for raising or lowering the free end of said boom;

a sheave carried at the free end of the boom;

a hoist cable looped over said sheave;

an eye affixed to said column near said lower end;

a chain threaded through said eye and secured at one end to said hoist cable; and chain anchor means affixed to said column near its upper end and slotted for edgewise admitting any selected single link of said chain into said slot but blocking passage of the next upwardly adjacent transversely oriented link through said slot thereby to anchor said chain to said column against the pull of a load suspended from said hoist cable, whereby the effective length of said chain can be conveniently adjusted by selecting the link inserted into the slot;

said eye acting to apply the lateral load component transmitted through said chain and cable to said column at a point near the base of said post so as to minimize the leverage effect on said base.

2. The hoist of claim 1 wherein said slotted means is a plate projecting laterally from said column and having a single open ended slot cut radially to said column into an outer edge of said plate and terminating in a closed slot end.

3. The hoist of claim 2 wherein said slot is cut into an upper concave surface of said plate such that the closed end of the slot is at a lower point of said concave surface than the open slot end in relation to said column so as to capture and prevent said next upwardly adjacent link from slipping out of said slot.

4. The hoist of claim 1 wherein said upright post is cylindrical and terminates in a transverse upper bearing surface, and said column is a hollow cylinder open at its lower end and closed at its upper end and having an inner diameter slightly oversized in relation to the outer diameter of said post and shorter in length than said post, such that the post may be snugly telescopically received within the column with said upper bearing surface in internal abutment with said closed upper end of said column, whereby the assembly comprising said column together with said boom and drive means mounted thereto is rotatably supported on said post and may be readily slidingly seated on or separated from said post.

5. The hoist of claim 4 further comprising grease inlet means in said column for injection of lubricant between said post and column to facilitate coaxial rotation of said column on said post.

6. A hoist comprising:

an upright cylindrical bearing post having a base at its lower end for mounting to an underlying structure such as the bed of a cargo vehicle and terminating in an upper bearing surface;

a hollow cylinder column open at its lower end and closed at its upper end, said column having an inner diameter slightly oversized in relation to the outer diameter of said post and being shorter in length than said post such that the post may be snugly telescopically received within the column with said upper bearing surface in internal abutment with said closed upper end of said column;

a boom hingedly joined at one end to the upper end of said column such that the opposite free end of the boom can be raised or lowered;

drive means connected between said column and said boom and operative for raising or lowering the free end of said boom;

a sheave carried at the free end of the boom;

a hoist cable looped over said sheave;

eye means affixed to said column near said lower end;

a chain threaded through said eye means and secured at one end to said hoist cable; and anchor means for releasably securing the other end of said chain to said column against the pull of a load carried by said cable;

whereby the assembly comprising said column together with said boom, drive means and chain are rotatably supported on said post and may be readily slidingly seated on or separated from said post.

* * * * *